United States Patent [19]

Teigen

[11] Patent Number: 4,784,533

[45] Date of Patent: Nov. 15, 1988

[54] SOLIDS FEEDER

[75] Inventor: Bard C. Teigen, Enfield, Conn.

[73] Assignee: Combustion Engineering, Inc., Windsor, Conn.

[21] Appl. No.: 922,315

[22] Filed: Oct. 14, 1986

[51] Int. Cl.⁴ .................................. B65G 51/16
[52] U.S. Cl. .................................. 406/14; 406/23; 406/30; 406/130; 406/137; 110/245
[58] Field of Search ............ 406/14, 23, 24, 25, 406/30, 32, 33, 91, 109, 130, 136, 137, 138, 146, 93, 94; 110/245, 259; 34/56, 57 A; 414/217

[56] References Cited

U.S. PATENT DOCUMENTS

| | | |
|---|---|---|
| 2,410,309 | 10/1946 | Simpson et al. ............ 406/146 X |
| 2,458,357 | 1/1949 | Evans ............................ 406/146 X |
| 2,677,604 | 5/1954 | Nelson ............................ 34/56 X |
| 2,921,817 | 1/1960 | Berg ................................ 406/146 X |
| 3,365,242 | 1/1968 | Marchetti ........................ 406/14 |
| 4,227,488 | 10/1980 | Stewart et al. ............... 110/245 X |
| 4,382,415 | 5/1983 | Korenberg ...................... 110/245 |

Primary Examiner—Sherman D. Basinger
Assistant Examiner—Paul E. Salmon
Attorney, Agent, or Firm—Arthur E. Fournier, Jr.

[57] ABSTRACT

Solids drained from a fluidized bed 10 pass to a conical transition section 36 and through valve 50 to a pneumatic transport line 46. The flow of solids is controlled by controllably 56 introducing air 58 into the transition section 36.

4 Claims, 2 Drawing Sheets

SOLIDS FEEDER

BACKGROUND OF THE INVENTION

This invention relates to particulate solid flow through a hopper and in particular to the control of such flow.

Fluidized bed combustors are recognized as a means of burning particulate fuel to generate heat. Typically, fuel such as coal having a maximum size of about 3 to 6 millimeters along with a small amount of similarly sized noncombustible particulate material is fed to a fluidized bed. Such beds operate in the temperature range of about 750° to 925° C. The particulate material comprising this bed contains in addition to the fuel, a sulfur absorbent such as limestone and ash from previously burned fuel.

The noncombustible particulate material tends to accumulate within the bed and must be drained from the bed, while maintaining an appropriate bed height of the remaining material. Drainpipes normally extend through the bed support plate into the bed to receive such particulate material. The drained material passes to a conveying means located beneath the fluidized bed combustor. A pneumatic transport line is often used to convey the solids away.

Because of the high temperature occurring within the bed, the material drained from the bed is hot and must be cooled to avoid damage to mechanical equipment and hazard in the disposal operation. Cooling of the solids generally dictates a spreading of the solids to a substantial flow area, compared to the area where they leave the bed, before combining the solids to a small flow area for introduction into the transport line. This increase in flow area allows particles to contact an appropriate surface of a cooler.

Occasional large particles may at times be encountered. Typical hopper flow problems and pluggage therefore occur.

The transport line has a pressure in the order of 40 to 80 KPa (6 to 12 psi) where it receives the solids compared to 14 KPa (2 psi) pressure within the fluidized bed itself. Some means must be provided to prevent or restrict air flow backwardly from the transport line into the bed. Rotary valves are expensive and subject to substantial wear in the ash laden atmosphere. Lock hoppers use substantial height, require cycling of the valves with concomitant wear, and result in erratic control.

A standing leg of the ash particles was proposed to act as an air seal against flow from the transport line. The solids would flow downward in the leg, with the solids flow controlled by a slide gate valve at the bottom of the leg.

An attempt was made to drain the solids in such manner into a conical hopper with a gate valve controlling the flow from the hopper. With a large valve in the order of 20 cm opening, I found flow occurring with low pressure in the transport line, but stoppage of the flow occurring against a high back pressure. In using a small valve in the order of 5 cm opening, I found the flow intermittently stopping even with low back pressure.

SUMMARY OF THE INVENTION

A bed drain receives solids from a fluidized bed, carrying a packed column of solids to a conical transition section below. This section carries the solids to a transport pipe, and contains a valve at the bottom of this transition section. A controlled air supply is introduced into the top of the transition section. The flow of air can be regulated to control the flow of solids exiting the bottom of the transition section. The amount of air flow is modulated in response to the fluidized bed height, to control the flow of the draining solids, and thereby the bed height.

DESCRIPTION OF THE PREFERRED EMBODIMENT

Figure 1:
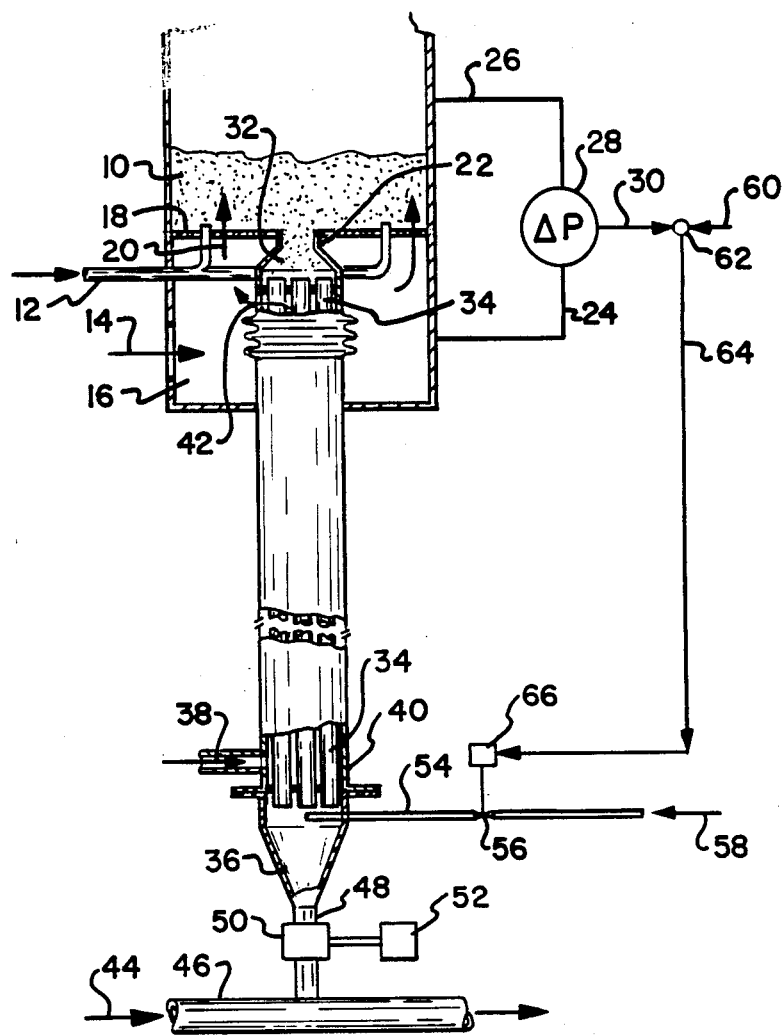
FIG. 1 is a side elevation of the fluidized bed and drain system.
Figure 2:
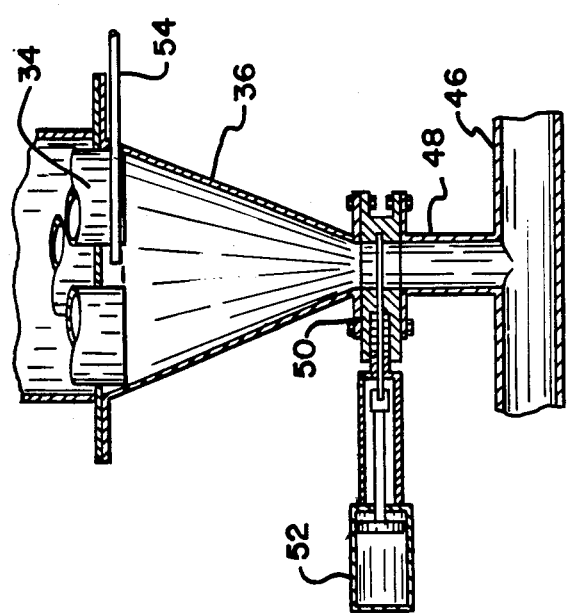
FIG. 2 is a side elevation of the lower portion of the drain system.

A fluidized bed 10 is operated with coal and limestone introduced through line 12. A combustion supporting air supply 14 is introduced to chamber 16 underneath the perforated bed support plate 18. This air supply passing upwardly 20 through the bed 10 fluidizes the bed in the well-known manner. Bed drainpipe 22 is located at the bottom of the fluidized bed 10 to allow draining of high density particulate material which tends to accumulate within the bed. A pressure tap 24 below the bed and a pressure tap 26 above the bed are used with pressure differential meter 28 to obtain a control signal 30 representative of the height of the bed.

The bed drain 22 has a first flow area of 320 square Cm (0.35 square feet) before it flares out into the lower portion 32 of the drainpipe. A plurality of supply pipes 34 are connected to receive the solid granular material from the bed drain and carry it down to a substantially conical transition section 36. A cooling air supply 38 passes up through spaces 40 and out through opening 42, thereby providing cooling for the hot solids passing through the supply pipes 34.

A conveying air supply 44 passes through pneumatic transport line 46 for the purpose of carrying away the particulate material. The transition section 36 must therefore be funneled down to a relatively small feed pipe 48 to guide the material into the transport line 46. Feed pipe 48 has a second flow area of 20 square Cm (0.022 square feet). A flow restricting means in the form of a gate valve 50 is located within this feed pipe. The gate valve has an actuator 52 for the purpose of varying the gate valve to various desired fixed openings. This gate valve would not be moved during normal operation but varied in position only when the drain load from the fluidized bed is varied in extreme amounts.

An injection means in the form of an air supply tube 54 is located to inject air into the transition section 36. Control valve 56 controls the amount of air from air supply 58 in an amount to achieve the desired flow of solids from the transition section 36.

In the earlier tests mentioned above, it was found that using a large valve flow through the drain ceased as the back pressure was increased. For instance with 14 KPa (2 psi) pressure in the fluidized bed, flow was stopped before the pressure in the area of the pneumatic transport line reached its normal value of 85 KPa (12 psi). As the pressure in the transport line exceeds that in the bed there is a tendency for the air to flow up through the packed column into the bed. With the small flow area at the bottom of the conical section as compared to the flow area in other portions of the system, the air velocity at the bottom of the transition section was apparently too high to permit downward flow of the solid particles. Air injected into the transition section 36 through pipe 54 supplied the appropriate leak off flow to the bed and accordingly permitted the solids to drain. Surprisingly it was also found that this solids flow could be controlled by varying the amount of injection of air.

In using the smaller 5 cm valve it was found that introduction of the air supply overcame the intermittent stoppage of flow. It is presumed that with the small valve the solid particles bridged and therefore flow stopped. Injecting air through line 54 at a sufficient pressure level forced some air down into the pneumatic conveying pipe and this air broke the front edge of the bridge, thereby permitting flow. In any event it was found that regardless of the size of valve 50 the amount of solids could be controlled by modulating the air flow into the transition section.

The height of the packed column of material above the air injection pipe 54 must be sufficient to resist the pressure of air to be injected. Using the average density of the packed solids the required height can be calculated. Using any appropriate units, the minimum height would equal the pressure divided by the average density. For typical ash, having an average density of 1442 Kg/cubic meter (90 pounds/cubic foot), an injection pressure of 2.99 KPa (12 psi) would dictate a height of 5.8 meters (19.2 feet).

The bed level signal 30 indicative of the pressure drop across the bed is compared to a desired bed level set point signal 60 at comparison point 62 producing an error signal 64. This error signal is passed to actuator and controller 66 to modulate valve 56 in an amount and direction to return the height of the fluidized bed 10 to its desired level. This permits a continuous control of the height of the fluidized bed without surges in the amount of solids removed therefrom, and permits the use of a relatively large size opening in valve 50, thereby avoiding pluggage which occurs when large size particles are drained from the bed.

I claim:

1. An apparatus for controlling the level of a fluidized bed of solid granular material comprising:
   (a.) a bed drain pipe connected to the fluidized bed for receiving solid granular material therefrom, said drain pipe having a first flow area;
   (b.) at least one supply pipe connected to receive the solid granular material from said bed drain pipe;
   (c.) a substantially conical transition section connected to receive the granular solid material from said supply pipe, said conical transition section having an upper half;
   (d.) a feed pipe connected to receive the solid granular material from said transition section, said feed pipe having a second minimum flow area less than said first flow area;
   (e.) a transport pipe located below and connected to receive the solid granular material from said feed pipe;
   (f.) air injection means for injecting air into said transition section;
   (g.) means for generating a signal indicative of a pressure drop across the fluidized bed;
   (h.) means for comparing the signal generated in paragraph (g.) to a desired fluidized bed level set point input;
   (i.) means for establishing an error signal based on the comparison made in paragraph (h.); and
   (j.) means for modulating air flow through said air injection means in response to said error signal.

2. The apparatus as set forth in claim 1 wherein said air injection means is located in said upper half of said transition section.

3. A method for controlling the level of a fluidized bed of solid granular material comprising the steps of:
   (a.) permitting particulate solids to flow into an open vertical pipe thereby forming a packed column of particulate solids;
   (b.) directing the solids downwardly into a downwardly converging transition section;
   (c.) directing the solids from the transition section through a feed pipe;
   (d.) introducing air into the transition section;
   (e.) generating a signal indicative of a pressure drop across the fluidized bed;
   (f.) comparing the signal generated in paragraph (e.) to a desired fluidized bed level set point signal;
   (g.) establishing an error signal based on the comparison made in paragraph (f.); and
   (h.) modulating the air introduced into the transition section in response to the error signal established in paragraph (g.).

4. An apparatus for controlling the flow of solid granular material from a low pressure region at the first level to a high pressure region at a second level of a fluidized bed comprising:
   (a.) a bed drain pipe having a first end and a second end, said drain pipe having the first end thereof connected to the fluidized bed for receiving solid granular material therefrom, said drain pipe having a first minimum flow area;
   (b.) a plurality of supply pipes each having a first end and a second end, said plurality of supply pipes being supported within said drain pipe so as to each have said first end thereof located in the low pressure region, said plurality of supply pipes being operative to receive solid granular material from the low pressure region by gravity feed;
   (c.) a conical transition section having a first end and a second end, said conical transition section having said first end thereof connected to said second end of said drain pipe for receiving solid granular material from said plurality of supply pipes;
   (d.) a feed pipe having one end thereof connected to said second end of said conical transition section for receiving solid granular material from said conical transition section and for conveying the solid granular material received thereby to the high pressure region said feed pipe having a second minimum flow area, said second minimum flow area of said feed pipe being less than said first minimum flow area of said drain pipe;
   (e.) a flow restricting means mounted within said feed pipe, said flow restricting means having an opening formed therewithin;
   (f.) means for varying the opening of said flow restricting mans in said feed pipe so as to achieve the desired flow of solid granular material from the fluidized bed into said drain pipe;
   (g.) a transport line located in the high pressure region, said transport line being connected to the other end of said feed pipe for receiving solid granular material therefrom and for discharging the solid granular material received thereby from the fluidized bed;

(h.) an air supply tube supported in juxtaposed relation to the connection between said second end of said drain pipe and said first end of said conical transition section, said air supply tube being operative to introduce air directly into said conical transition section to effect the discharge of solid granular material from said conical transition section into said feed pipe; and (i.) means for controlling the amount of air supply to said air supply tube so as to achieve a desired flow of solid granular material from said conical transition section to said feed pipe.

* * * * *